United States Patent [19]
Nakajima

[11] Patent Number: 5,719,643
[45] Date of Patent: Feb. 17, 1998

[54] SCENE CUT FRAME DETECTOR AND SCENE CUT FRAME GROUP DETECTOR

[75] Inventor: Yasuyuki Nakajima, Tokyo, Japan

[73] Assignee: Kokusai Denshin Denwa Kabushiki Kaisha, Tokyo, Japan

[21] Appl. No.: 714,786

[22] Filed: Sep. 13, 1996

Related U.S. Application Data

[63] Continuation of Ser. No. 281,293, Jul. 27, 1994, abandoned.

[30] Foreign Application Priority Data

Aug. 10, 1993 [JP] Japan .................................. 5-216895
Feb. 22, 1994 [JP] Japan .................................. 6-046561

[51] Int. Cl.⁶ .................................................. H04N 5/14
[52] U.S. Cl. .................................................. 348/700
[58] Field of Search .................................. 348/700, 701, 348/699, 420, 401, 409, 412, 415; 382/236, 239, 168

[56] References Cited

U.S. PATENT DOCUMENTS

| | | | |
|---|---|---|---|
| 5,032,905 | 7/1991 | Koga | 348/700 |
| 5,099,322 | 3/1992 | Gove | 348/700 |
| 5,404,174 | 4/1995 | Sugahara | 348/700 |

OTHER PUBLICATIONS

"Proposal of Colloquial Video Editing Systems Adopting Recognition Technique", *Proceedings in the Society of Electronic Information Communication Engineers of Japan*, D–II, vol. J75–D–II, No. 2, February 1992 by Ueda et al.

"Video Cut Frame Detection Using Filters", *1993 Autumn Meeting of the Electronic Information Communication Engineers of Japan, D264, 1993*, by Otsuji et al.

*Primary Examiner*—Amelia Au
*Attorney, Agent, or Firm*—Westman, Champlin & Kelly, P.A.

[57] ABSTRACT

An input image and a reference image which are input to a contracted image processing unit, are converted into contracted image, which are constituted by average values of blocks of the input and reference frames. With respect to the contracted image, an inter-frame difference unit determines the inter-frame difference $D_n$ between the input and reference images and the temporal change $\Delta D_n$ in the inter-frame difference. A first judging unit judges, according to the above data, the input frame to be a non-cut frame, a cut frame or a cut frame candidate. When the input frame is judged to be a cut frame, an output unit effects a cut frame output, and then the next input frame processing is performed. With respect to a cut frame candidate, a chrominance histogram correlation unit calculates the correlation $\rho$ of the color distribution of the chrominance histogram by using contracted image of chrominance signal. A second judging unit makes an overall judgment on the inter-frame difference $D_n$, temporal change $\Delta D_n$ therein, and correlation $\rho$ for the cut frame detection.

5 Claims, 9 Drawing Sheets

(REFERENCE FRAME r)

PRIOR ART (INPUT FRAME i)

PRIOR ART

 *FIG. 3A* (INPUT FRAME)
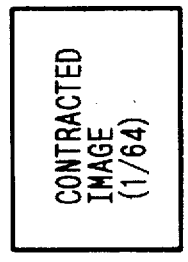 *FIG. 3B* (LUMINANCE SIGNAL Y)
*FIG. 3C* (CHROMINANCE SIGNAL U, V)
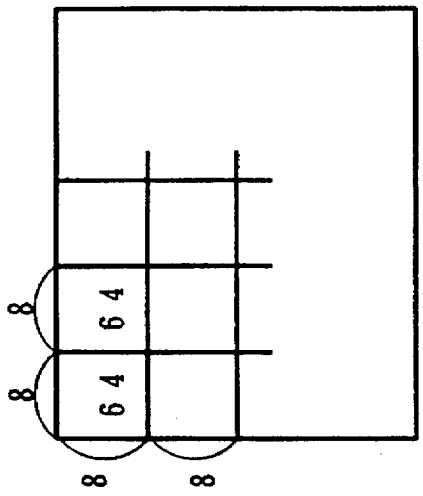 *FIG. 3D* (REFERENCE FRAME)
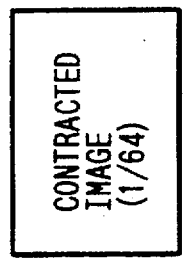 *FIG. 3E* (LUMINANCE SIGNAL Y)
 *FIG. 3F* (CHROMINANCE SIGNAL U, V)
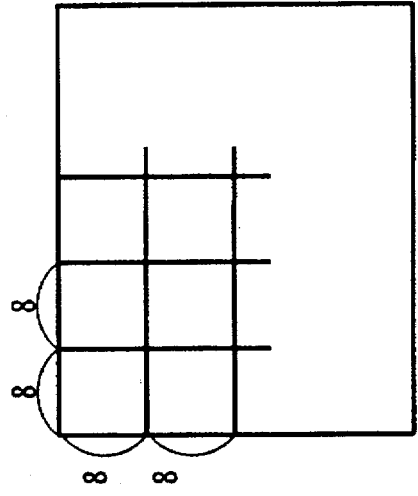

SCENE CUT FRAME DETECTOR AND SCENE CUT FRAME GROUP DETECTOR

This is a continuation of application Ser. No. 08/281,293, filed Jul. 27, 1994 now abandoned. Priority of the prior application is claimed pursuant to 35 USC § 120.

BACKGROUND OF THE INVENTION

1. Field of the Invention

This invention relates to a scene cut frame detector and, more particularly, a scene cut frame detector, which can detect quickly and highly accurately an instant of scene switching, i.e., a cut point, in scene comprising original, i.e., non-coded, or coded scene data. The invention also relates to a scene cut frame group detector for checking whether a cut frame corresponds to an instant of switching of the same group scene.

2. Description of the Prior Art

At present, home video cameras have become very popular and are extensively utilized in various events such as trips, sport events, wedding ceremonies, etc. Video camera pictures are often taken whenever they are wanted by the user. There are many users who edit video tape portions with desired and undesired scenes picked up thereon by reproducing the video tape after taking the pictures and adequately combine only the video tape portions with their desired scenes taken thereon. Also, there are users who re-edit usual television broadcasts by detecting the instants of scene switching, i.e., cut points. Scene cut can also be used as a video browsing in which viewers can overview the content of a video.

There have been proposals of editing apparatuses or systems for supporting such user's editing activity with respect to the video. The technology will be briefly summarized with reference to FIGS. 1A to 1D.

A reference frame and an input frame as shown in FIGS. 1A and 1C, for instance, are each divided into blocks each of 8 pixels by 6 lines. Then, block-by-block color histograms as shown in FIGS. 1B and 1D are obtained. In these color histograms, the ordinate is taken for the frequency of occurrence of color, and the abscissa is taken for various colors. In each block consisting of 48 pixels, the color peculiar to each pixel among the 16 different colors is determined, whereby the block is expressed as a color histogram. Then, similarity $S_j$ is taken between the color histograms $h_{r,j,c}$ and $h_{i,j,c}$ of each block (j) of the reference and input frames (r) and (i) with respect to the 16 different colors using a formula $$S_j = \sum_{c=1}^{16} |h_{r,j,c} - h_{i,j,c}|$$

Then, the similarity is determined for each frame by using the number of blocks, of which the similarity Sj is above a threshold value, as an inter-frame correlation. Then, cut frame detection is done by comparing the threshold with the time difference of the similarity.

As literatures disclosing techniques concerning the above technology, there are Ueda et al., "Proposal of Colloquial Video Editing Systems Adopting Recognition Techniques", Proceedings in the Society of Electronic Information Communication Engineers of Japan, D-11, Vol. J75-D-11, No. 2, pp. 216–255, 1992, and Otsuji et al., "Video Cut Frame Detection Using Filters", 1993 Autumn Meeting of the Electronic Information Communication Engineers of Japan, D264, 1993.

For the recognition and retrieval of compressed video using the above prior art techniques, the compressed data is once perfectly decoded to restore the initial scene before the operations of the recognition and retrieval.

In the above prior art techniques, for highly accurate cut frame detection all the scene data in the frame is divided into blocks each of 8 pixels by 6 lines, and the similarity of each frame is determined and compared for the detection. For example, in the case of the NTSC television system for the cut frame detection the similarity of each frame is determined and compared for all 30 frames per second. This poses a problem that a great hardware load is necessary for the processing. In addition, where a work station is used, the reported processing rate that is necessary is about 8 frames per second, that is, about four times as long as playback time is necessary. Therefore, it is difficult to achieve quick cut frame detection.

To solve this problem, it has been proposed to subsample the frames to about 2 frames per second. In this case, however, even a quick movement results in a projected pixel change area, thus leading to a problem of erroneous cut frame detection.

Further, in the prior art for the detection of a cut frame from compressed video data, it is necessary to perfectly decode the video data before the cut frame detection processing. This means that a total time including the video decoding time and the cut frame detection time is necessary. This imposes great practical restrictions on the cut frame detection for a great quantity of video data bases and so forth.

Moreover, where there are a great deal of cut points, cut points in a scene of substantially the same content in such scenes as different camera angle can be grouped together in order to achieve more efficient video browsing than viewing all the scene cut frames.

SUMMARY OF THE INVENTION

An object of the invention is to provide a scene cut frame detector, which has been completed in the light of the above prior art and permits reduction of the detection processing time to preclude the drawback in the prior art without sacrificing detection accuracy.

Another object of the invention is to provide a scene cut frame group detector, in which cut frames presumed to be in the same scene are grouped to permit the user to obtain cut frame retrieval efficiently.

A feature of the invention resides in dividing an input frame and a reference frame which is spaced apart time-wise by one frame or a plurality of frames from the input frame each into a plurality of blocks, producing contracted image of the input and reference frames from the luminance signal average over the blocks of each of the input and reference frames, obtaining the inter-frame differences of the luminance signals and temporal changes in the inter-frame differences from the contacted image, and determining the input frame to be a cut frame, a non-cut frame or a cut frame candidate according to the inter-frame differences of the luminance signals and the temporal changes in the inter-frame differences.

Another feature of the invention resides in taking the histogram correlation of chrominance components of the contracted image of the reference and input frames with respect to a cut frame candidate obtained in the processing noted above and determining the cut frame candidate to be a cut frame or a non-cut frame according to the chrominance component histogram correlation, changes in the luminance signals and the changes in the inter-frame differences.

A further feature of the invention resides in producing contracted image data from input video data, obtaining inter-frame differences concerning an attention frame n (n being a positive integer) and frames (n−1) and (n+1) spaced apart time-wise by one frame or a plurality of frames ahead of or behind the attention frame n by totalizing the inter-frame luminance differences among the contracted image of the frames n, (n+1) and (n−1), obtaining an inter-frame chrominance histogram correlation from the chrominance histograms among the contracted image of the frames (n+1), n and (n−1), and effecting a judgment as to whether the attention frame n is a cut frame from the temporal change in the inter-frame luminance difference of the attention frame n with respect to the inter-frame luminance differences of the frames (n−1) and (n+1) and also from the temporal change in the chrominance histogram correlation of the attention frame n with respect to the chrominance histogram correlations of the frames (n−1) and (n+1).

A still further feature of the invention resides in determining a cut frame from a temporal change in the inter-frame luminance difference of an input video frame and a temporal change in the chrominance histogram correlation of the input frame, obtaining the chrominance histogram correlation among detected cut frames, and judging a cut frame group from the chrominance histogram correlation among the cut frames.

BRIEF DESCRIPTION OF THE DRAWINGS

FIGS. 3A to 3F are views for describing the operation of a contracted image processing unit shown in FIG. 2;

DETAILED DESCRIPTION OF THE PREFERRED EMBODIMENTS

Figure 1A:
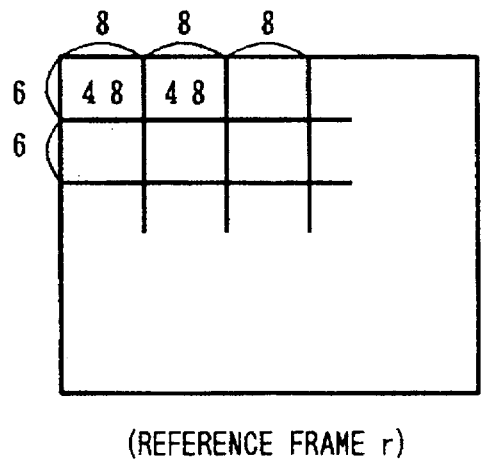
FIGS. 1A to 1D are views for describing color histograms in a prior art system of high speed detection of a cut frame in time-varying imagery.
Figure 1B:
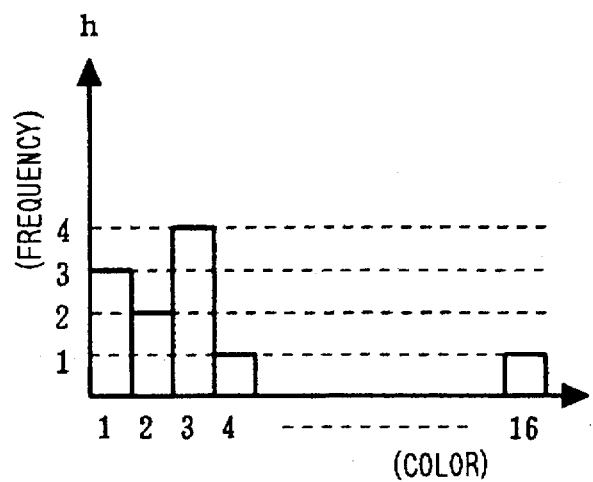
Figure 1C:
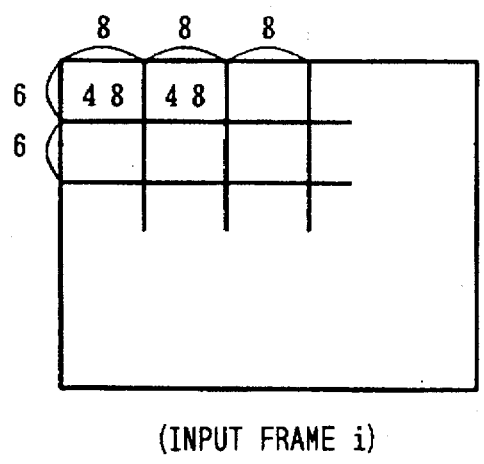
Figure 1D:
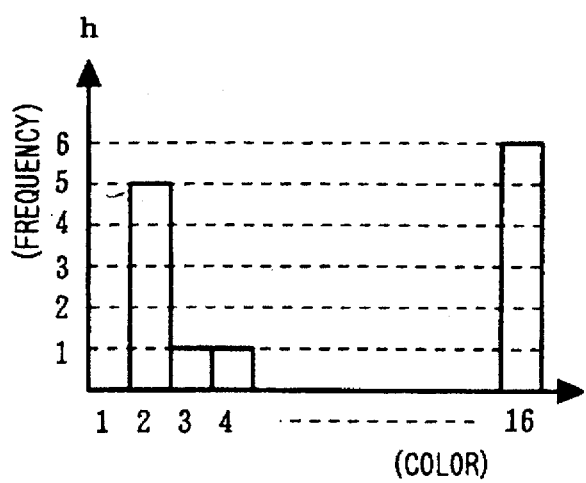
Figure 2:
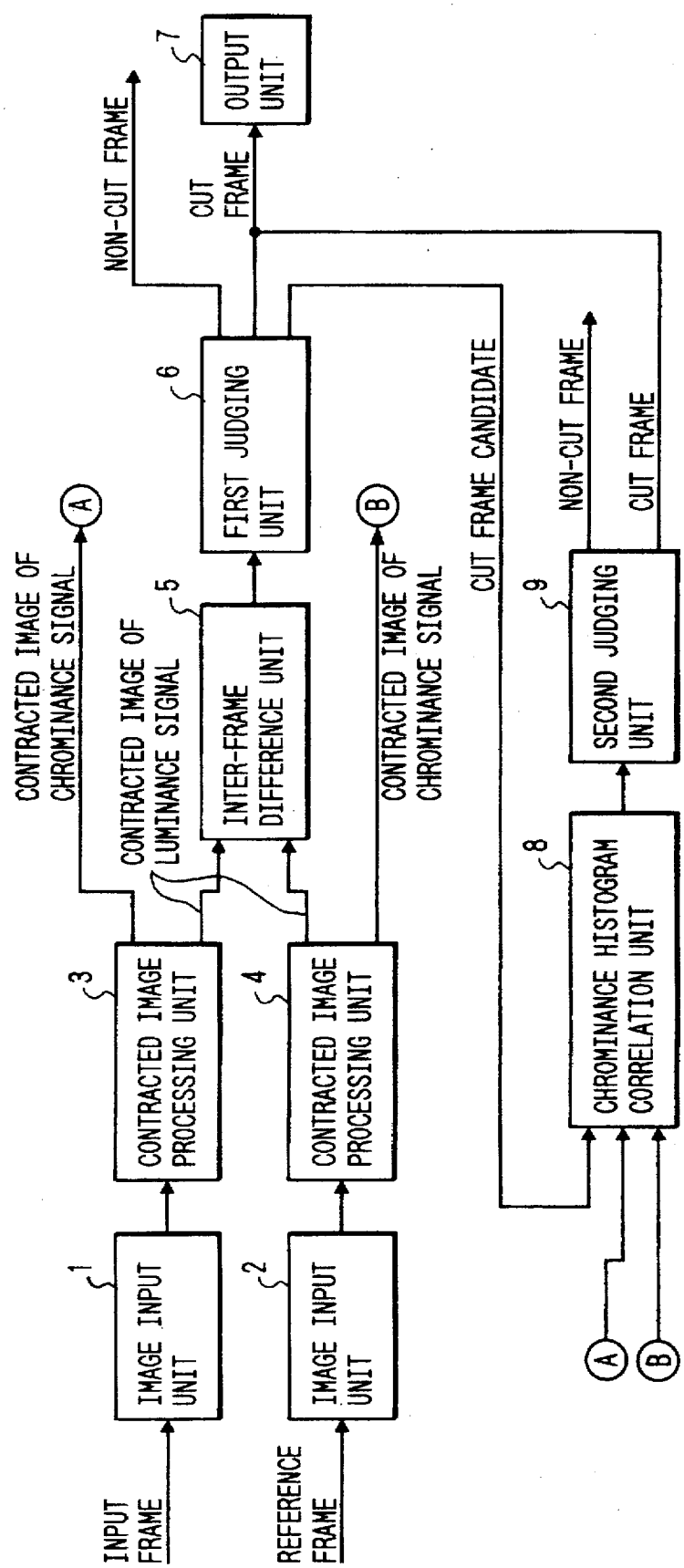
FIG. 2 is a block diagram schematically showing an embodiment of the invention.

Now, the invention will be described in detail with reference to the drawings. FIG. 2 is a block diagram showing an embodiment of the scene cut frame detector according to the invention.

Referring to the Figure, designated at 1 is an image input unit of an input frame, and at 2 another image input unit of a reference frame. As the reference frame may be used one, which is spaced apart time-wise by one frame or a plurality of frames (for instance 2 to 15 frames) from the input frame. Designated at 3 and 4 are contracted image processing units for contracting the input and reference frames coupled to the image input units 1 and 2 to produce contracted image of luminance and chrominance signals. Designated at 5 is an inter-frame difference unit for receiving luminance signal contracted image from the contracted image processing units 3 and 4 and obtaining, from the received contracted image, the inter-frame difference $D_n$ between the input and reference frames and a temporal change $\Delta D_n$ in the inter-frame difference. Designated at 6 is a first judging unit for judging whether the input frame is a non-cut frame, a cut frame or a cut frame candidate according to $D_n$ and $\Delta D_n$. Designated at 7 is an output unit for outputting an input frame judged to be a cut frame or data (such as frame number, etc.) indicative of that input frame.

Designated at 8 is a chrominance histogram correlation unit for obtaining a chrominance histogram correlation with respect to a frame which has been judged in the first judging unit 6 to be a cut frame candidate. The chrominance histogram correlation unit 8 calculates a color distribution correlation value ρ by obtaining, using the contracted image of the chrominance signal obtained in the contracted image processing unit 3, the color distribution of the chrominance histogram.

Designated at 9 is a second judging unit. The second judging unit 9 effects cut frame detection through overall judgment on the inter-frame difference $D_n$, temporal change $\Delta D_n$ therein and correlation value ρ. If the input frame is judged to be a cut frame, the output unit 7 outputs the input frame judged to be the cut frame or data indicative thereof. Subsequent to the output of the input frame judged to be the cut frame or the like from the output unit 7 or when the input frame is judged to be a non-cut frame, the first and second judging units 6 and 9 proceed to the next input frame processing.

Now, the operation of this embodiment will be described in detail. The operation of the contracted image processing units 3 and 4 will first be described with reference to FIGS. 3A to 3F.

Assuming the input and reference frames that are coupled to be as shown in FIGS. 3A and 3D, the contracted image processing units 3 and 4 divide these frames each into blocks each of 8 pixels by 8 lines, for instance, and obtain the average value of the luminance data Y and chrominance data U and V of each block. The average value may, for instance, be obtained by taking the sum of the luminance and chrominance data in each block and dividing the sum by the number of data pieces, i.e., pixels, in the block.

The contracted image processing units 3 and 4 then produce contracted image of luminance and chrominance data on the basis of the average values thus obtained. More specifically, the contracted image processing unit 3 produces contracted image of luminance and chrominance signals as shown in FIGS. 3B and 3C, which are 1/64 of the total data of the original input frame. Likewise, the contracted image processing unit 4 produces contracted image of luminance and chrominance signals as shown in FIGS. 3E and 3F, consisting of 1/64 of the total data of the original input frame.

The operation of the inter-frame difference unit 5 will now be described. The inter-frame difference unit 5 obtains the inter-frame difference $D_n$ by using the contracted image of luminance Y corresponding to the reference and input frames. The inter-frame difference $D_n$ may be obtained by using the following formula.

$$Dn = \sum_{i=1}^{T} |DY_{i,n} - DY_{i,n-1}| \quad (1)$$

where DY is the block average of the luminance, T is the total block number, i is the block number, and n and (n-1) are frame numbers, n being the input frame, and (n-1) being the reference frame. In the following description, it is assumed that DY is expressed as 8 bits (256 stages), but this is by no means limitative.

A temporal change $\Delta D_n$ in the inter-frame difference $D_n$ is obtainable as $$\Delta D_n = D_n - D_{n-1} \quad (2)$$

where $D_{n-1}$ is the inter-frame difference between the frames (n-1) and (n-2).

Figure 4:
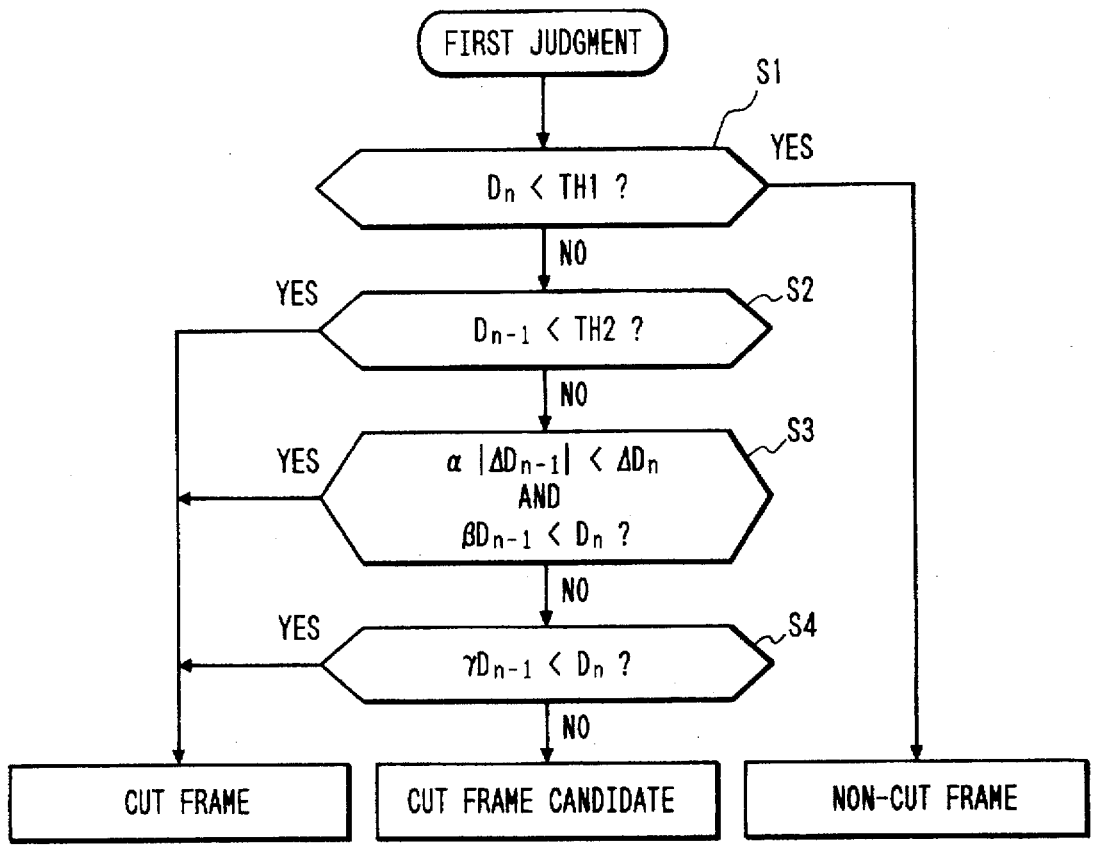
FIG. 4 is a flow chart for describing the contents of processing in a first judging unit in one embodiment of the invention.

The first judging unit 6 judges the input frame to be one of three different frames, i.e., a non-cut frame, a cut frame and a cut frame candidate. The details of this processing will now be described with reference to the flow chart of FIG. 4.

First, in a step S1 a check is done as to whether the inter-frame difference $D_n$ meets the condition of the following formula (3). If the condition is met, the input frame is judged to be a non-cut frame. Otherwise, it is judged to be a cut frame candidate, and a step S2 is executed.

$$D_n < TH1 \quad (3)$$

where TH1 is a first threshold value. Generally, if still images are continued without scene switching, the inter-frame difference $D_n$ is very small, the formula (3) is met.

In the step S2, a check is done with respect to the frame which has been judged in the step S1 to be a cut frame candidate as to whether the inter-frame difference $D_{n-1}$ meets the condition of the following formula (4). If the condition is met, the candidate is judged to be a cut frame. Otherwise, it is judged to be a cut frame candidate, and a step S3 is executed.

$$D_{n-1} < TH2 \quad (4)$$

where TH2 is a second threshold value. The reason why the cut frame candidate is judged to be a cut frame if the condition of the formula (4) is met, is that although the inter-frame difference $D_n$ of the n-th frame is large, the inter-frame difference $D_{n-1}$ of the preceding frame is small in the case of a cut frame after a succession of still frames.

In the step S3, a check is done with respect to the frame which has been judged in the step S2 to be a cut frame candidate as to whether the inter-frame differences $D_n$ and $D_{n-1}$, and its temporal changes $\Delta D_n$ and a $D_{n-1}$ of the inter-frame differences meet the condition of the following formulas (5). If the condition is met, the candidate is judged to be a cut frame. Otherwise, it is judged to be a cut frame candidate, and a step S4 is executed.

$$\alpha|\Delta D_{n-1}| < \Delta D_n \text{ and } \beta D_{n-1} < D_n \quad (5)$$

where $\alpha$ and $\beta$ are constants. The reason why the cut frame candidate is judged to be a cut frame if the condition of the formulas (5) is met, is that in the case of occurrence of a cut frame after a gentle movement such as a panning the inter-frame difference $D_n$ and the temporal change $\Delta D_n$ therein of the n-th frame are greater than $D_{n-1}$ and $\Delta D_{n-1}$ of the (n-1)-th frame respectively.

In the case of occurrence of a cut frame after a somewhat violent movement, although the inter-frame difference $D_{n-1}$ of the (n-1)-th frame is large, the inter-frame difference Dn of the n-th frame is larger. Thus, in the step S4 a check is done as to whether the inter-frame differences $D_n$ and $D_{n-1}$ meet the condition of the following formula (6). If the condition is met, the cut frame candidate is judged to be a cut frame. Otherwise, it is judged as a cut frame candidate.

$$\gamma D_{n-1} < D_n \quad (6)$$

where $\gamma$ is a constant.

In the formulas (3) to (6), TH1, TH2, $\alpha$, $\beta$ and $\gamma$ may be as follows, T being the total block number of one frame.

$$TH1=4T, TH2=10T, \alpha=4, \beta=2, \text{ and } \gamma=4.$$

As shown above, with this embodiment the judgment as to whether the input frame is a cut frame, a non-cut frame or a cut frame candidate may be made by using the contracted image of luminance signals obtained by contraction of frame to 1/64 in the contracted image processing sections 3 and 4. It is possible to let the cut frame candidate after the process in the step S4 be judged to be a non-cut frame.

Since in this embodiment the processed data quantity is less (i.e., 1/64 of the frame data), the processing time of the cut frame detection can be reduced without reducing the accuracy of detection.

Now, the operation of a second embodiment of the invention will be described. In this second embodiment, the input frame which has been judged to be a cut frame candidate in the first embodiment, is further judged using contracted image of the chrominance signals U and V as to whether it is a cut frame or a non-cut frame.

Figure 5:
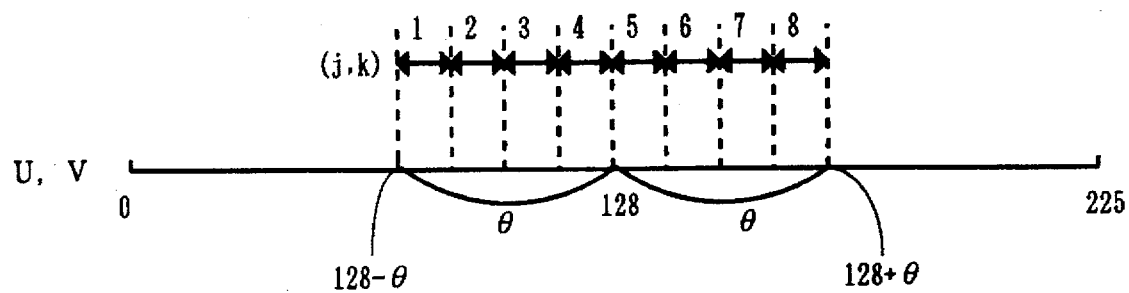
FIG. 5 is a view for describing area numbers j and k of chrominances U and V in a second embodiment of the invention.

It is assumed that each element data of the contracted image of the chrominance signals U and V obtained in the contracted image processing units 3 and 4 consists of 8 bits, for instance. The chrominance histogram correlation unit 8 divides the contracted image of chrominance signal U, V of the frame which has been judged to be a cut frame candidate in the first embodiment into 8 divisions in a range of $\pm\theta$ with respect to U, V=128 and takes a histogram $H_{n,j,k}$, where n is the frame number, and j and k area numbers of U and V and j, k=1, . . . , 8. Since the maximum value of the 8-bit element data is 255, as shown in FIG. 5, the division of the contracted image into 8 divisions is made in a range of $\pm\theta$ with respect to 128, one half the maximum value. Here, $\theta$ is a predetermined constant and may, for instance, be $\theta=32$. The area numbers of the 8 divisions of U and V are denoted by j and k. The histogram $H_{n,j,k}$ is then defined as follows.

When j=1 and K=1, for instance, $H_{n,1,1}$ represents the number of element data such that $$128-\theta \leq DU < 128-3\theta/4 \text{ and } 128-\theta \leq DV < 128-3\theta/4.$$

Figure 6:
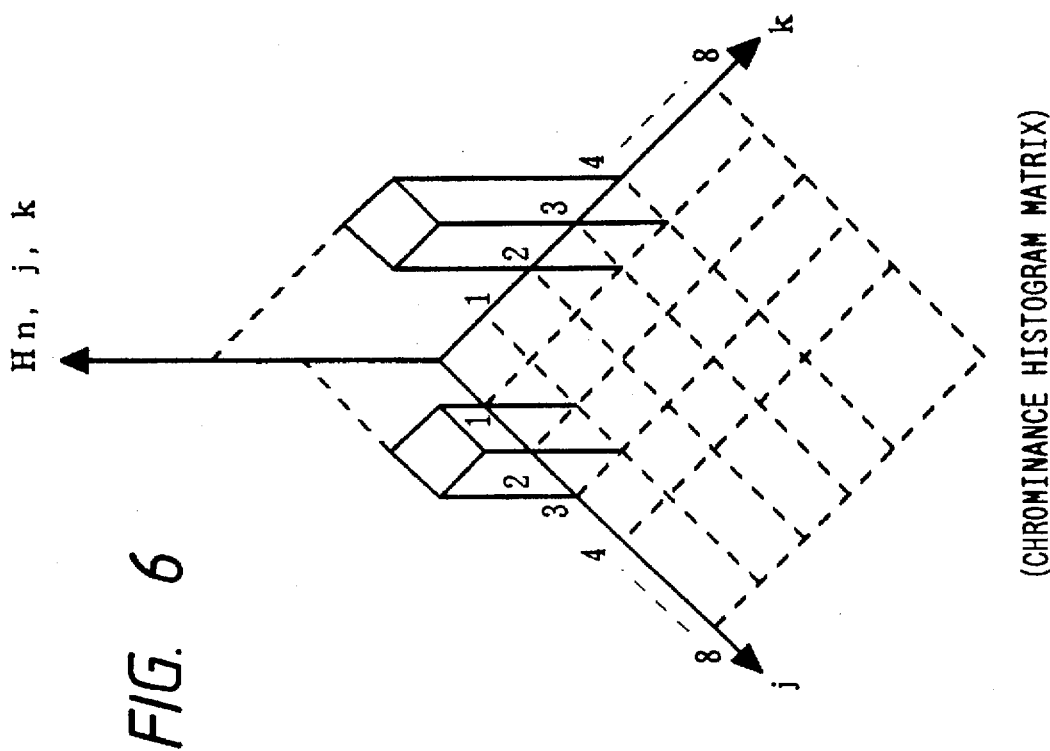
FIG. 6 is a view for describing a chrominance histogram matrix $H_{n,j,k}$.

DU and DV are numbers of chrominance element data. FIG. 6 shows an 8×8 chrominance histogram matrix of $H_{n,j,k}$ which is obtained in the above way.

The chrominance histogram matrix correlation $\rho$ is calculated by using the formula (7) below.

$$\rho = CC_n/(AC_n \times AC_{n-1})^{1/2} \quad (7)$$

where $CC_n = \sum_j \sum_k (H_{n,j,k} \times H_{n-1,j,k})$ $$AC_n = \sum_j \sum_k H_{n,j,k}^2 \quad (8)$$

$$AC_{n-1} = \sum_j \sum_k H_{n-1,j,k}^2 \quad (9)$$

Figure 7:
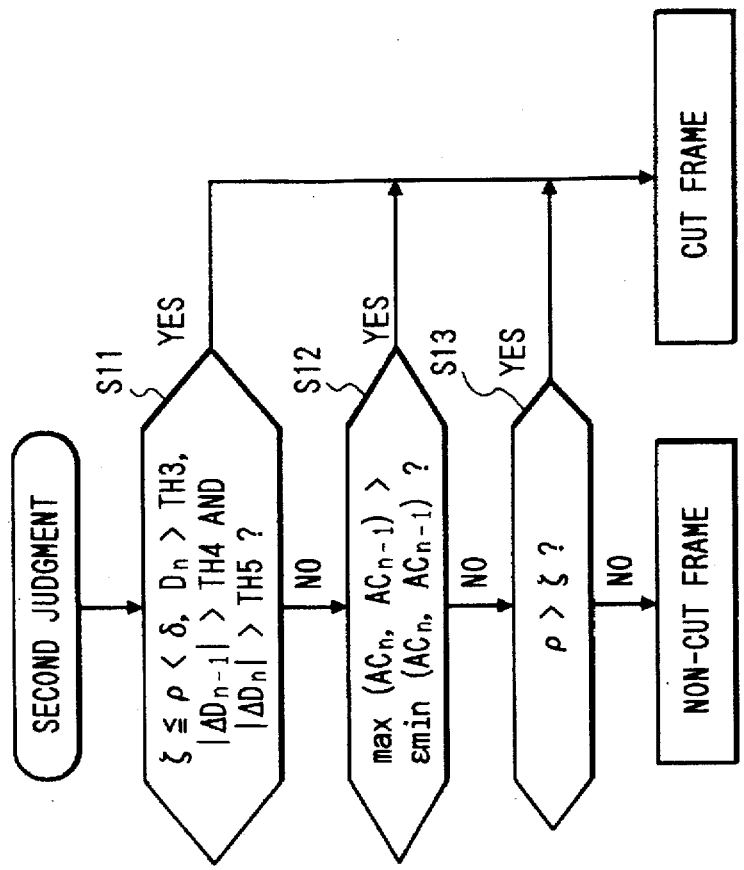
FIG. 7 is a flow chart for describing the contents of processing in a second judging unit in the second embodiment of the invention.

The second judging unit 9 effects cut frame detection through overall judgment of the inter-frame difference Dn (see formula (1)), the temporal change $\Delta D_n$ thereof (see formula (2)) and the correlation ρ (see formula (7)). The operation of the second judging unit 9 will now be described in detail with reference to the flow chart shown in FIG. 7.

In a step S11, a judgment is done on a cut frame in such a case as a different camera angle. In cut frames with different camera angles, the color distribution around the cut point is similar. In addition, the chrominance histogram matrix correlation ρ has a comparatively large value, and the inter-frame difference Dn and temporal change $\Delta D_n$ therein are large. Thus, in the step S11 the cut frame candidate is judged to be a cut frame if the condition of the following formulas (10) is met, and otherwise it is judged again in a subsequent step S12.

$$\zeta \leq \rho < \delta,\ D_n > TH3,\ |\Delta D_{n-1}| > TH4\ \text{and}\ \Delta D_n > TH5 \quad (10)$$

When the color distribution is greatly different, $AC_n$ and $AC_{n-1}$ noted above are greatly different. Thus, in the step S12, the cut frame candidate is judged to be a cut frame if the condition of the following formula (11) is met, and otherwise it is judged again in a subsequent step S13.

$$\max(AC_n, AC_{n-1}) > \epsilon \min(AC_n, AC_{n-1}) \quad (11)$$

In the step S13, the cut frame candidate that does not meet the above condition is judged to be a cut frame, only if the chrominance histogram matrix correlation ρ is large. That is, it is judged to be a cut frame if the condition of the following formula (12) is met, and otherwise it is judged to be a non-cut frame for the next input frame processing.

$$\rho > \zeta \quad (12)$$

If the second judging unit 9 determines a cut frame in the above processing, the output unit 7 outputs the cut frame, the frame number thereof, etc. for the next input frame processing. If the frame in the processing is judged to be a non-cut frame, the next input frame processing is executed immediately.

In the formulas (7) to (12), TH3 to TH5, δ, ε, and ζ may be as follows.

$$TH3=23T,\ TH4=4T,\ TH5=11T,\ \delta=0.9,\ \epsilon=8,\ \zeta=0.75\ \text{and}\ \theta=32.$$

As shown above, in the second embodiment the input frame which has been judged to be a cut frame candidate in the first embodiment is further judged as to whether it is a cut or a non-cut frame by using the contracted image of the chrominance signals U and V. Thus, it is possible to improve the accuracy of the scene cut frame detection and permit reduction of the detection processing time.

Now, a third embodiment will now be described. In this embodiment, the input and reference frames shown in FIG. 2 are constituted by compression coded data obtained by DCT (discrete cosine transform) or the like. In this case, the coded video data are input to the image input units 1 and 2. The contracted image processing units 3 and 4 extract average components of the pertinent blocks from the coded data and obtains averages. Using these averages, the units produce contracted image.

Where the coded data are of two-dimensional DCT of 8×8 pixels, for instance, the contracted image processing units 3 and 4 divide the (0, 0) component, i.e., DC component, obtained after the two-dimensional DCT by 8 and produce the contracted image by collecting the resultant values for each block. The processing in the inter-frame difference unit 5 and subsequent units is the same as in the first and second embodiments, and thus it is not described nay further.

In the third embodiment, unlike the prior art system there is no need of once decoding the input coded data to restore the original imagery, and the processing is possible by merely extracting the average components from the coded data. It is thus possible to obtain cut frame extraction very quickly.

The above first to third embodiments may be modified variously. For example, in the average calculation to obtain the contracted image, the block size is not limited to 8 pixels by 8 lines, but it is possible to adopt various other sizes as well, for instance 16 pixels by 16 lines, 4 pixels by 4 lines, or 1 pixel by 1 line where no average is performed.

Further, for improving the accuracy of detection, the first and second judging units 6 and 9 may use not only the data (D, ΔD, ρ and AC) of the frames n and (n−1) but also data which is past time-wise with respect to the frame (n−1), for instance the frame (n−2) or (n−3).

Further, where quick operation is required, this may be realized by selecting some of the conditions of the formulas (3) to (12). In this case, however, it is forecast that erroneous detection, for instance failure of detection or over-detection, will be increased.

Further, it is possible to control the percentage of failure of detection or over-detection by changing the various parameters TH1 to TH5 and α to θ.

Figure 8:
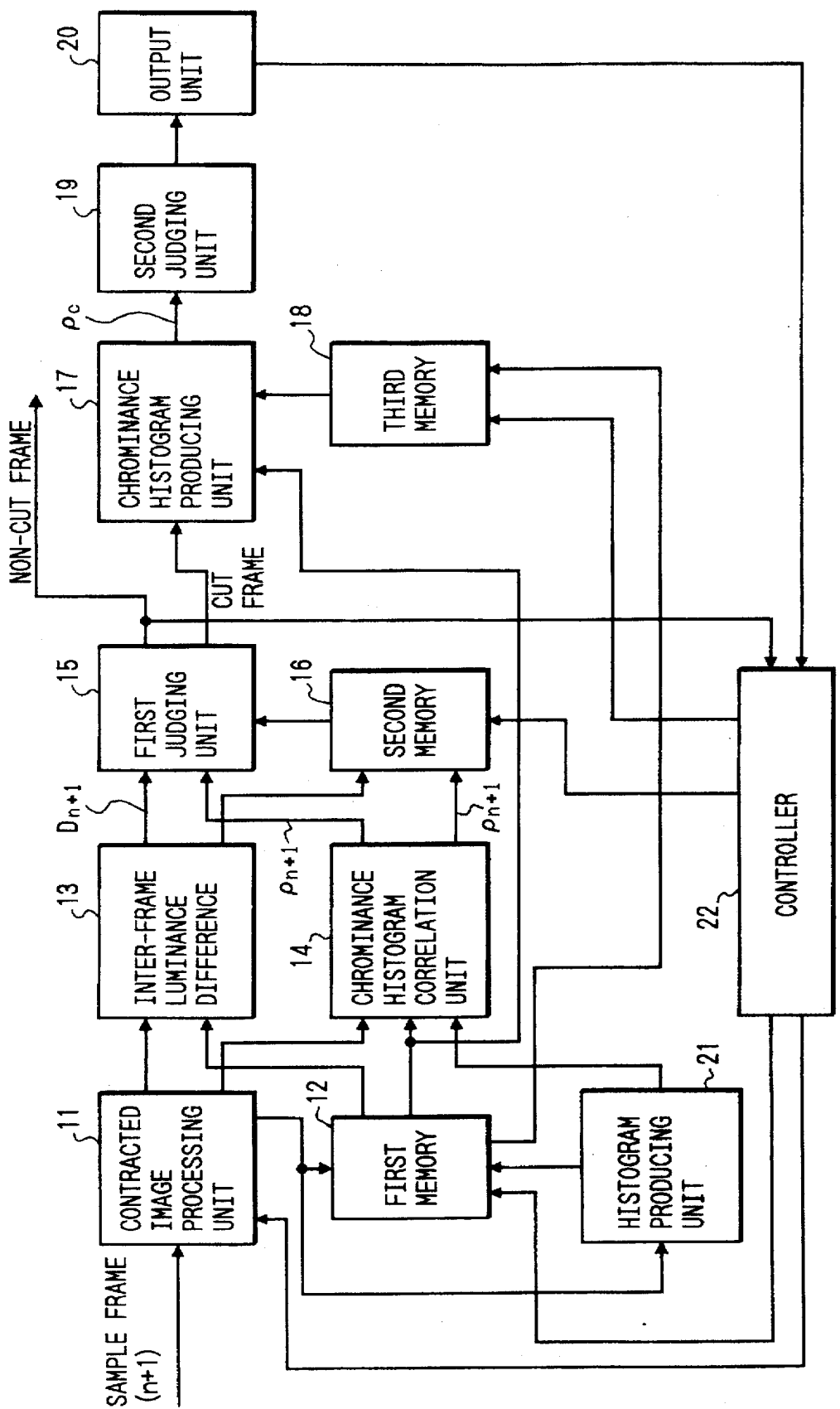
FIG. 8 is a block diagram schematically showing a scene cut frame group detector as a fourth embodiment of the invention.

Now, a fourth embodiment of the invention will be described with reference to FIG. 8. FIG. 8 is a block diagram showing the embodiment of the invention.

A sample frame (n+1) which is sampled in a sampling unit (not shown) at a predetermined interval from continuous frames, is input to a contracted image processing unit 11. The contracted image processing unit 11 divides the frame (n+1) into a plurality of blocks each of, for instance, 8 pixels by 8 lines, as shown in FIG. 3A, and obtains the averages of the luminance and chrominance signals Y and U, V as shown in FIGS. 3B and 3C. The frames that are constituted by these average values are output as contracted image to a first memory 12, an inter-frame luminance difference unit 13 and a chrominance histogram producing unit 21.

In the first memory 12, a preceding contracted image that has been obtained in the contracted image processing unit 11 has been stored. The inter-frame luminance difference unit 13 obtains the luminance signal inter-frame difference $D_{n-1}$ from the luminance contracted image (n+1) having been obtained in the contracted image processing unit 11 and the luminance contracted image frame n read out from the first memory 12. The chrominance histogram producing unit 21 obtains the chrominance histogram of the contracted image (n+1). The histogram thus obtained is stored in the first memory 12 and is also fed to a chrominance histogram correlation unit 14.

The chrominance histogram correlation unit 14 obtains the chrominance histogram correlation $\rho_{n+1}$ of the contracted image n and (n+1) from the color difference signal histogram of the contracted image n read out from the first memory 12 and the chrominance signal histogram of the contracted image (n+1) input from the chrominance histogram producing unit 21. The first judging unit 15 judges the frame n to be one of two different frames, i.e., a non-cut and a cut frame, by using the inter-frame luminance difference $D_{n+1}$ obtained in the inter-frame luminance difference unit 13, the chrominance histogram correlation $\rho_{n+1}$ obtained in the chrominance histogram correlation 14, the inter-frame luminance differences $D_n$ and $D_{n-1}$ and chrominance histogram correlations $\rho_n$ and $\rho_{n-1}$ obtained from a second memory 16.

The chrominance histogram correlation unit 17 obtains, with respect to each frame which has been judged to be a cut frame in the first judging unit 15, the inter-cut-frame chrominance and histogram correlation $\rho_c$ by using the chrominance histogram matrix of that cut frame and the chrominance histogram matrix of the preceding cut frame stored in a third memory 18. A second judging unit 19 judges using the inter-cut-frame chrominance and histogram correlation $\rho_c$ whether the cut frame is a group member cut frame or an independent cut frame. An output unit 20 outputs the group member or independent cut frame or data indicative thereof. When a frame is judged to be a non-cut frame in the first judging unit 15 or after the output of a group member or independent cut frame or the like from the output unit 20 as a result of determination of a cut frame in the second judging unit 19, the next input frame processing is executed. Designated at 22 is a controller for controlling the processing in the individual processing units. In FIG. 8, for the brevity of the description only necessary lines for controlling the storage of data in the first to third memories as part of the operation of the controller 22 are shown.

Figure 9:
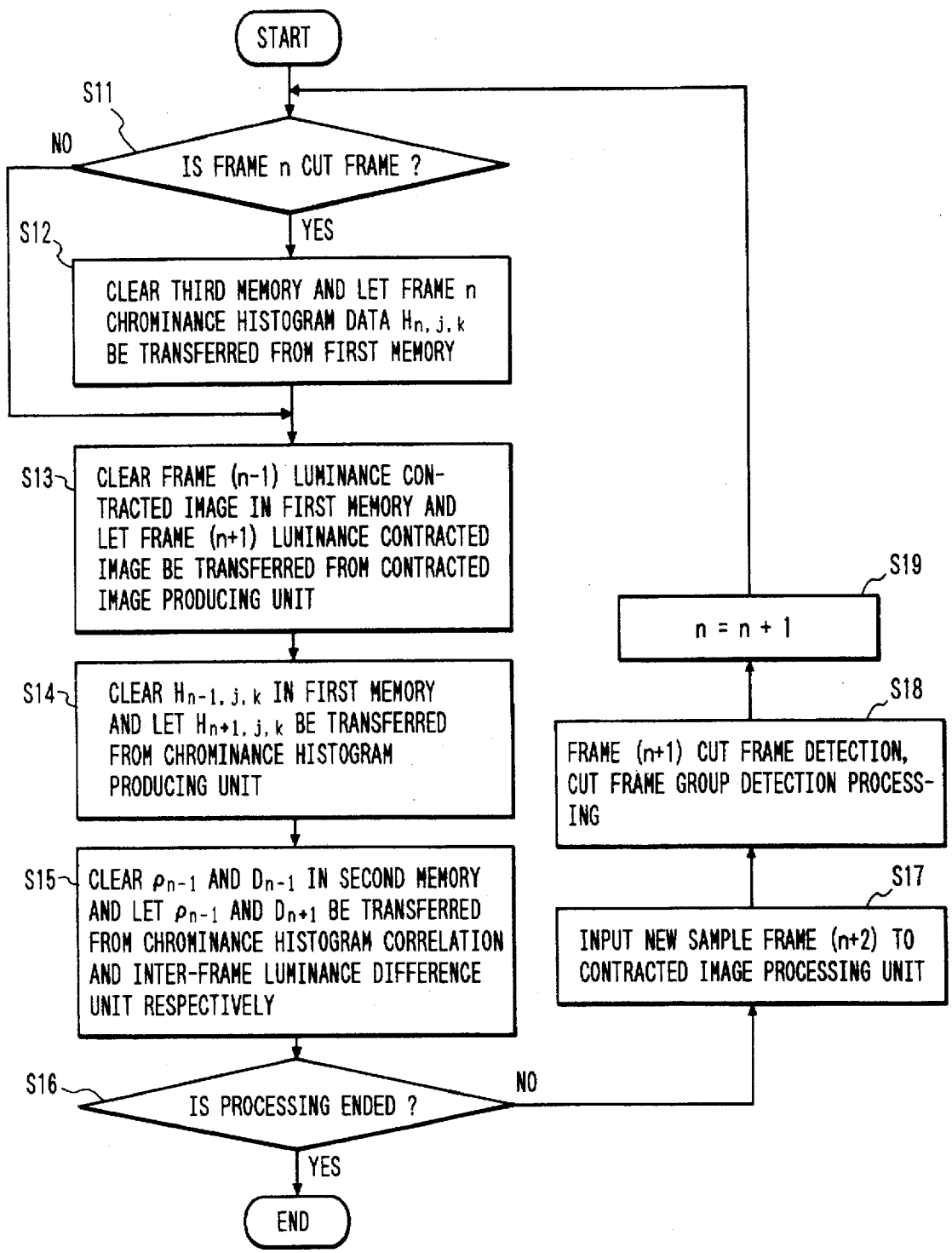
FIG. 9 is a flow chart illustrating part of the operation of a controller shown in FIG. 8.

FIG. 9 is a flow chart illustrating mainly the operation of the control of storing data in the first to third memories in the controller 22.

In a step S11, the controller 22 makes a check as to whether the frame n is a cut frame. This check is done by obtaining from the output unit 20 information indicative of that the frame n is a cut frame and also obtaining from the first judging unit 15 indicative of that the frame n is a non-cut frame. If a YES result is obtained in the step S11, a subsequent step S11 is executed, in which the controller 22 clears the third memory 18 and lets the chrominance histogram data of the frame n be transferred from the first memory 12. If the result of the check in the step S11 is NO or when the execution of the step S12 is ended, a step S13 is executed.

In the step S13, the controller 22 clears the luminance contracted image of the frame (n−1) in the first memory 12 and lets the luminance contracted image of the frame (n+1) be transferred from the contracted image processing unit 11. In a subsequent step S14, the controller 22 clears the chrominance histogram data $H_{n-1,j,k}$ of the frame (n−1) in the first memory 12 and lets the chrominance histogram data $H_{n+1,j,k}$ of the frame (n+1) be transferred from the chrominance histogram producing unit 21. Thus, at this moment, the luminance contracted image and chrominance histogram data of the frames n and (n+1) have been stored in the first memory 12.

In a subsequent step S15, the controller 22 clears the chrominance histogram correlation $\rho_{n-1}$ and the inter-frame luminance difference $D_{n-1}$ of the frame (n−1) in the second memory 16 and lets the chrominance histogram correlation $\rho_{n+1}$ of the frame (n+1) be transferred from the chrominance histogram correlation unit 14. Further, it lets the inter-frame luminance difference $D_{n+1}$ of the frame (n+1) be transferred from the inter-frame luminance difference unit 13. At this moment, the chrominance histogram correlations and the inter-frame luminance differences of the frames n and (n+1) have been stored in the second memory 16.

In a subsequent step S16, a check is done as to whether all of the processing of the cut frame detection in the video file has been ended. If the result of the check is NO, a step S17 is executed to input a new sample frame (n+2) to the contracted image processing unit 11. In a subsequent step S18, cut frame detection and cut frame group detection are executed with respect to the frame (n+1). This processing is executed by using the data stored in the first to third memories and the luminance contracted imagery and chrominance histogram data obtained from the sample frame (n+2). This processing will be described later in detail. In a subsequent step S19, n is incremented by one.

Now, the operation of this embodiment, particularly the operation in the step S18, will be described in detail.

The operation of the contracted image processing unit 11 is the same as in the contracted image processing unit 3 or 4 shown in FIG. 2, and thus it will not be described. In case where the input data are compressed by 8×8 two-dimensional DCT coded time-varying imagery data of a block data, as the average may be used what is obtained by dividing the (0, 0) component of the two-dimensional DCT by 8.

The inter-frame luminance difference 13 obtains the inter-frame luminance difference $D_{n+1}$ by using the luminance contracted image of the frame (n+1) obtained from the contracted image processing unit 11 and of the frame n obtained from the first memory 12. $D_{n+1}$ may be obtained by using the following formula.

$$D_{n+1} = \Sigma |DY_{i,n+1} - DY_{i,n}|, \; i=1, \ldots, T,$$

where DY is the block average of the luminance, T the total block number, i is the block number, and (n+1) and n are frame numbers.

The chrominance histogram producing unit 21 produces the 8×8 chrominance histogram matrix $H_{n,j,k}$ as shown in FIG. 6 by an operation similar to that described earlier in connection with the chrominance histogram correlation unit 8 shown in FIG. 2.

The chrominance histogram correlation unit 14 obtains the frame (n+1) chrominance histogram matrix correlation $\rho_{n+1}$ from the frame (n+1) histogram matrix obtained from the chrominance histogram producing unit 21 and the frame n histogram matrix obtained from the first memory 12. The chrominance histogram matrix correlation $\rho_{n+1}$ may be calculated by using the following formula (13).

$$\rho_{n+1} = CC_{n+1}/(AC_{n+1} \times AC_n)^{1/2} \qquad (13)$$

$$\text{where } CC_{n+1} = \sum_j \sum_k (H_{n+1,j,k} \times H_{n,j,k}) \qquad (14)$$

$$AC_n = \sum_j \sum_k H_{n,j,k}^2 \qquad (15)$$

$$AC_{n+1} = \sum_j \sum_k H_{n+1,j,k}^2 \qquad (16)$$

The first judging unit 15 judges whether the frame n is a cut frame or a non-cut frame by checking temporal changes in the frames (n−1), n and (n+1) from the inter-frame luminance difference $D_{n+1}$ obtained from the inter-frame luminance difference 13, the inter-frame luminance differences $D_n$ and $D_{n-1}$ of the frames n and (n−1) and the histogram correlations $\rho_n$ and $\rho_{n-1}$ obtained from the second memory 16 and the chrominance histogram correlation $\rho_{n+1}$ obtained from the chrominance correlation unit 14. At this time, the inter-frame luminance differences $D_n$ and $D_{n-1}$ and the chrominance histogram correlations $\rho_n$ and $\rho_{n-1}$ of the frames n and (n−1) have been stored in the second memory 16, as is obvious from the above description in connection with FIG. 9.

In the cut frame judgment in the first judging unit 15, for removing noise irrelevant to the cut frame detection the following judgment is made with respect to a frame that $$D_n > T0 \qquad (17)$$

After the above condition is met, the following three judgements are applied.

Of these judgments, the judgment in (1) is done first. The frame which is judged in this judgment (1) to be a non-cut point is judged in the other two judgments (2) and (3). Either of the judgments (2) and (3) may be done first.

Figure 10A:
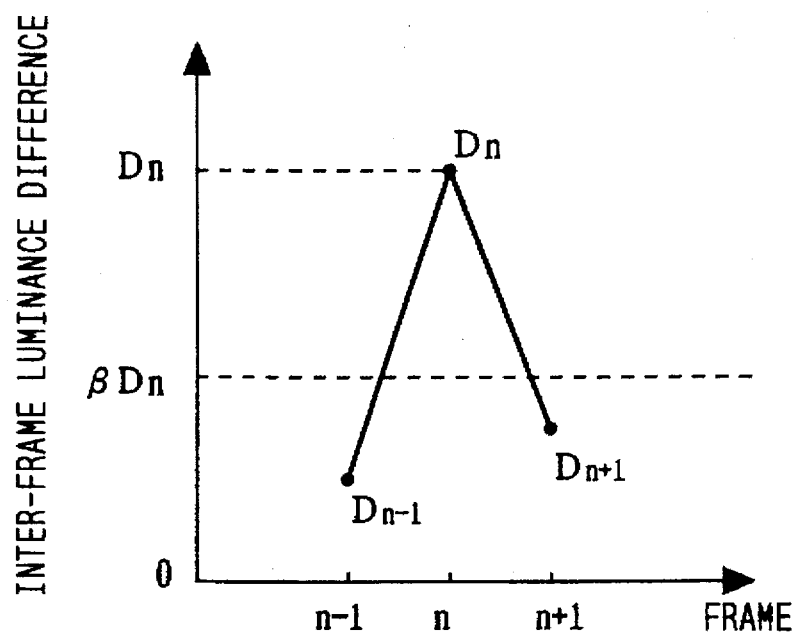
FIGS. 10A and 10B are graphs illustrating part of the operation of a first judging unit shown in FIG. 8.
Figure 10B:
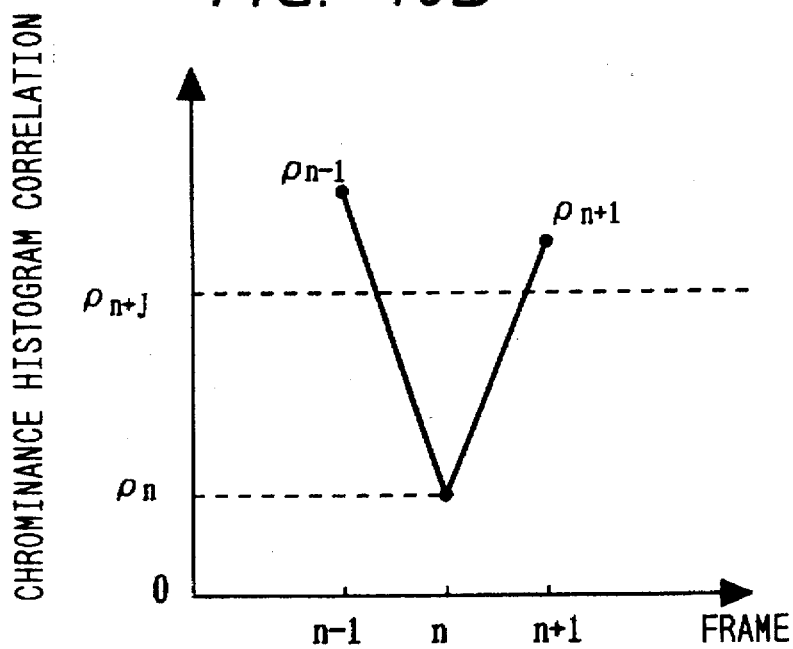

(1) Cut frame detection from inter-frame luminance difference and temporal change in chrominance histogram correlation In fast zooming or the like, the inter-frame luminance difference has a large peak which is subject to erroneous detection to be a cut frame. To avoid such erroneous detection, if the frame luminance difference has an upwardly convex peak time-wise while the chrominance histogram correlation has a downwardly convex peak time-wise, and also if the inter-frame luminance difference and the chrominance histogram correlation meet the condition of the following formulas (18) and (19) as shown in FIGS. 10A and 10B, the frame is judged to be a cut frame.

$$\beta D_n > D_{n-1} \text{ and } \beta D_n > D_{n+1} \qquad (18)$$

$$\rho_n + \gamma < \rho_{n-1} \text{ and } \rho_n + \gamma < \rho_{n+1} \qquad (19)$$

(2) Cut frame detection from temporal change in inter-frame luminance difference At the point of scene switching such as a camera angle change or the like, the inter-frame luminance difference $D_n$ has a great peak time-wise although the background is not substantially changed. Thus, if the inter-frame luminance difference meets the condition of the following formulas (20) and (21), the frame is judged to be a cut frame.

$$D_n - T1 > D_{n-1} \text{ and } D_n - T1 > D_{n+1} \qquad (20)$$

or $$D_n > \alpha D_{n-1} \text{ and } D_n > \alpha D_{n+1},$$

here, $$0 < \alpha < 1 \qquad (21)$$

(3) Cut frame detection from chrominance histogram correlation

Where the scene is changed with a short period of time, cut frames occur continuously as sampled frames. In addition, the inter-frame luminance difference has high values continuously but does not become a large peak. However, the chrominance histogram correlation becomes very small at the cut point. Thus, if the chrominance histogram correlation meets the condition of the following formula (22), the frame is judged to be a cut frame.

$$\rho_n < T2 \qquad (22)$$

At the times of the judgments (1) to (3) as above, the inter-frame luminance differences $D_n$ and $D_{n-1}$ and the chrominance histogram correlations $\rho_n$ and $\rho_{n-1}$ of the frames n and (n-1) have been stored in the second memory 16, as is obvious form the above description in connection with FIG. 9.

The chrominance histogram correlation unit 17 calculates the inter-cut-frame chrominance histogram matrix correlation $\rho_c$ from the former cut frame chrominance histogram matrix $H_{c,j,k}$ stored in the third memory 18 and the frame n chrominance histogram matrix $H_{n,j,k}$ stored in the first memory 2 by using the following formula.

$$\rho_c = CC_c/(AC_n \times AC_c)^{1/2} \qquad (23)$$

-continued $$\text{where } CC_c = \sum_j \sum_k (H_{n,j,k} \times H_{c,j,k}) \qquad (24)$$

$$AC_n = \sum_j \sum_k H_{n,j,k}^2 \qquad (25)$$

$$AC_c = \sum_j \sum_k H_{c,j,k}^2 \qquad (26)$$

At this time, the cut frame chrominance histogram matrix $H_{c,j,k}$ of the frame (n-1) has been stored in the third memory 18, as is obvious form the above description in connection with FIG. 9.

Subsequently, the second judging unit 19 executes an inter-cut-frame group judgment operation. The second judging unit 19 executes the inter-cut-frame group judgment from the correlation $\rho_c$ obtained in the chrominance histogram correlation unit 17. Where the background is substantially alike, the inter-cut-frame correlation of the chrominance signal is high. Thus, if the condition of the following formula (27) is met, the frame is judged to be a cut frame in the same group, i.e., the same scene.

$$\rho_c > T3 \qquad (27)$$

Figure 11A:
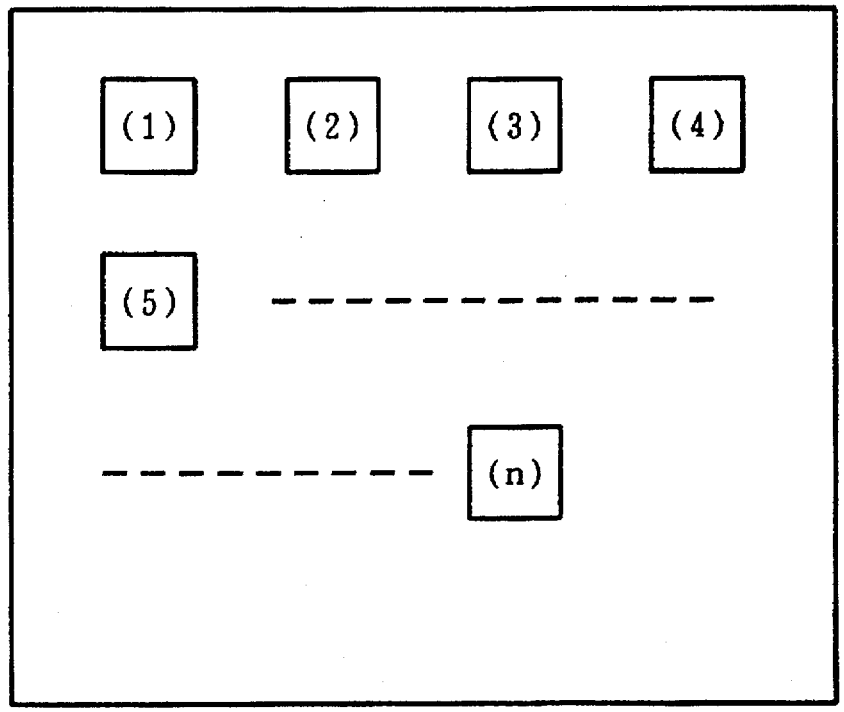
FIGS. 11A and 11B are views showing examples of display on the screen of an output unit shown in FIG. 8.
Figure 11B:
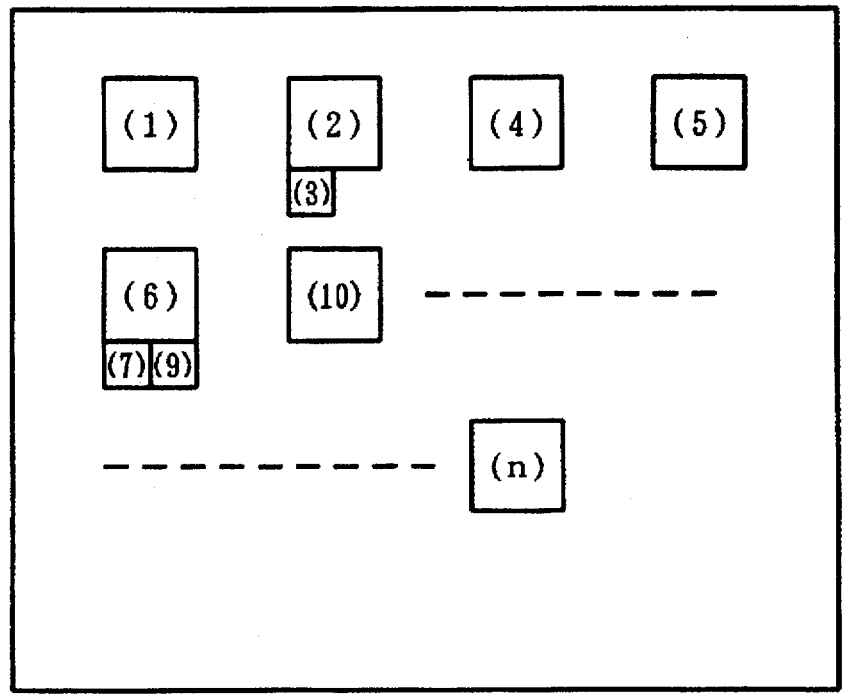

The output unit 20 can display only the frames which have been judged to be cut frames on the display as shown in FIG. 11A. Further, the cut frames which have been judged to be in the same group, may be displayed in the form of a subimage, as shown in FIG. 11A, provided under the cut frame first detected in the same group. When this is done so, it is possible to permit judgment of the cut frame group. Further, this form of display permits display of a number of cut frames in one frame, thus facilitating the user's cut frame retrieval and also improving the retrieval speed. In the figure, shown by (1) to (n) are cut frame numbers.

The above embodiments can be modified variously. For example, for the average calculation to obtain the contracted image the block size is not limited to 8 pixels by 8 lines but it is possible to adopt various other sizes as well, for instance 16 pixels by 16 lines and 4 pixels by 4 lines or 1 pixel by 1 line where no average is performed.

Further, where high speed is required, it is possible to selectively use some of the conditions of the above formulas (18) to (22). In this case, however, it is forecast that failure of detection or erroneous detection of cut frames will increase.

Further, by accumulating frames judged to be cut frames in a cut frame file, it is possible to restore and output only cut frames afterwards. If the video data is compressed by such a standard as MPEG (ISO IS11172), the cut file can be made from MPEG compressed data by extracting the corresponding cut frame.

Further, it is possible to indicate a cut frame in the same group by providing a flag representing the same group. In case of cut file MPEG format, this flag can be stored in user data area of MPEG.

Further, it is possible to control the rate of the failure of detection or the over-detection by altering the various parameters T0 to T3, $\alpha$, $\beta$, $\gamma$, $\theta$ and m.

The following is an example of the parameters.

T0=10T, T1=22T, T2=0, T3=0.85, $\alpha$=0.2, $\beta$=0.75, $\gamma$=0, $\theta$=32 and m=3, T being the total block number of the luminance signal in the frame.

As described in the foregoing, according to the invention contracted image signals obtained by using the block averages of the input frame and the reference frame spaced apart by one frame or a plurality of frames from the input frame and the inter-frame differences of the luminance components and the temporal changes in the inter-frame differences obtained by using the contracted image signals are used for the scene cut frame detection. Thus, according to the invention the quantity of data necessary for the processing can be reduced, thus permitting the reduction of the scene cut frame detection time without reduction of the detection accuracy.

Further, according to the invention by using the contracted images obtained by using the block averages of the input frame and the reference frame spaced apart by one frame or a plurality of frames from the input image frame, a frame as a cut frame candidate is selected according to the inter-frame differences of the luminance components and the temporal changes in the inter-frame differences, the chrominance histogram correlation is obtained with respect to a cut frame candidate, and a cut frame is detected from overall judgment on the chrominance component histogram correlation, the inter-frame differences and the temporal changes therein. In this case, since the necessary quantity of data for the processing can be reduced by using the contracted images, the detection processing time can be greatly reduced compared to the case where the retrieval is done using original imagery. In addition, the processing is less affected by fine noise in units of pixels and local changes, and it is thus possible to increase the accuracy of the scene cut frame detection. Further, it is possible to realize hierarchical processing by hierarchically using the inter-frame differences of the luminance components and the chrominance histogram correlation.

Further, according to the invention the retrieval of cut frames from compression coded imagery data is obtainable without need of decoding imagery to the original imagery. That is, the contracted image can be produced by merely extracting average components from the coded data, and it is thus possible to obtain very quick cut frame detection.

Cut frame detection from actual time-varying imagery was made with the second embodiment of the invention to obtain the following results. Using test time-varying imagery containing some pieces of news, a bit stream was obtained by coding with an ISO standardized MPEGI system. With respect to this bit stream, the cut frame detection was made by setting the interval between the reference and input frames to 15 frames. The ratio of cut frames failed to be detected to cut frames which were correctly detected (non-detection ratio) was 2.5%, and the ratio of erroneously detected frames which were intrinsically not cut frames (over-detection ratio) was 17.5%. As a whole, detection ratios which were comparable to those in the prior art detection method could be obtained. The detection processing could be ended in about ⅕ of the reproduction time, thus permitting an increase of the operation speed to 20 times or more compared to the prior art system.

In the fourth embodiment of the invention, the detection processing is made by using an attention frame and frames spaced apart therefrom time-wise by one frame or a plurality of frames, and detection of cut and non-cut frames is done by using the inter-frame differences of luminance signals of the contracted image and the temporal change in the chrominance histogram correlation. Thus, the retrieval time can be greatly reduced. In addition, the processing is less affected fine noise in units of pixels and local changes, thus permitting accuracy increase as a merit.

Further, since the cut frame detection is done with the combination of the inter-frame luminance differences and the temporal change in the chrominance histogram correlation, it is possible to detect various kinds of scene switching points.

Further, according to the invention it is possible to obtain the effects that cut points of the same contents with only camera angle differences can be judged to be in the same scene, that these cut frames can be displayed as a group, and that this display permits efficient retrieval of time-varying imagery.

The fourth embodiment of the invention was actually carried out to obtain the following results. Using test time-varying imagery containing some pieces of news, a bit stream was obtained by coding with an ISO standardized MPEGI system. With respect to this bit stream, the cut frame detection was made by setting the interval between the reference and input frames to 15 frames. The ratio of cut frames failed to be detected to cut frames which were correctly detected (non-detected ratio) was 4.9%, and the ratio of erroneously detected frames which were intrinsically not cut frames (over-detection ratio) was 7.3%. As a whole, detection ratios which were comparable to those in the prior art detection method could be obtained.

What is claimed is:

1. A scene cut frame detector for detecting a cut frame in time-varying imagery, comprising:

a contracted image processing unit for dividing an input frame and a reference frame, which is spaced apart time-wise by one frame or a plurality of frames from the input frame, each into a plurality of blocks having a plurality of pixels and producing contracted image of the input and reference frames from the luminance signal average over the pixels in each block of each of the input and reference frames;

an inter-frame difference unit for obtaining the inter-frame differences of the luminance signals and the temporal changes in the inter-frame differences from the contracted image of the input and reference frames; and a first judging unit for judging the input frame to be a cut frame or a non-cut frame according to the inter-frame differences of the luminance signals and the temporal changes in the interframe differences, wherein the first judging unit determines the input frame to be a non-cut frame if the condition given by formula (1) below is met by the inter-frame differences $D_n$ (n being the frame number) and $D_{n-1}$ of the luminance signals and the temporal changes $\Delta D_n$ and $\Delta D_{n-1}$ in the inter-frame differences and to be a cut frame if the conditions given by formulas (2) to (4) below are met:

$$D_n < TH1 \quad (1)$$

$$D_{n-1} < TH2 \quad (2)$$

$$\alpha|\Delta d_{n-1}| < \Delta D_n, \text{ and } \beta D_{n-1} < D_n \quad (3)$$

$$\tau D_{n-1} < D_n \quad (4)$$

where TH1 and TH2 are threshold values (TH1<TH2), and $\alpha$, $\beta$ and $\tau$ are constants.

2. A scene cut frame detector for detecting a cut frame in time-varying imagery comprising:

a contracted image processing unit for dividing an input frame and a reference frame, which is spaced apart time-wise by one frame or a plurality of frames from the input frame, each into a plurality of blocks and producing contracted image of the input and reference frames from the luminance signal average over the blocks of each of the input and reference frames;

an inter-frame difference unit for obtaining the inter-frame differences of the luminance signals and the temporal changes in the inter-frame differences from the contracted image of the input and reference frames;

a first judging unit for judging the input frame to be a cut frame, a non-cut frame or a cut frame candidate according to the inter-frame differences of the luminance signals and the temporal changes in the inter-frame differences;

a chrominance histogram correlation unit for obtaining a histogram correlation of the color different components of the contracted image of the input and reference frames with respect to the cut frame candidate; and a second judging unit for judging the input frame to be a cut frame or non-cut frame according to the chrominance component histogram correlation, the inter-frame differences of the luminance signals and the temporal changes in the inter-frame differences.

3. The scene cut frame detector according to claim 2, wherein:

the second judging unit determines the input frame to be a cut frame if the condition of either one of formulas (5) to (7) below is met by the inter-frame differences $D_n$ (n being the frame number) and $D_{n-1}$, the temporal changes $\Delta D_n$ and $\Delta D_{n-1}$ of the inter-frame differences and the chrominance component histogram correlation $\rho$ and to he a non-cut frame if none of the conditions of the formulas (5) to (7) is met:

$$\zeta \leq \rho < \delta, \ D_n > TH3, \ |\Delta D_{n-1}| > TH4 \text{ and } \Delta D_n > TH5 \quad (5)$$

$$\max(AC_n, AC_{n-1}) > \epsilon \min(AC_n, AC_{n-1}) \quad (6)$$

$$\rho > \zeta \quad (7)$$

where TH3 to TH5 are threshold values, and $\epsilon$, $\zeta$ and $\delta$ are constants. Further, $$AC_n = \Sigma\Sigma H_{n,j,k}^2, \text{ and}$$

$$AC_{n-1} = \Sigma\Sigma H_{n-1,j,k}^2.$$

$H_{n,j,k}$ is the chrominance component histogram.

4. A scene cut frame detector for detecting a cut frame in time-varying imagery comprising:

a contracted image producing unit for producing contracted image data from input frame data;

an inter-frame luminance difference calculation unit for calculating the inter-frame luminance differences through the luminance differences of the contracted image of an attention frame n (n being a positive integer), frames (n−1) and (n+1) which are spaced part time-wise by one frame or a plurality of frames ahead of or behind the attention frame;

a histogram correlation calculation unit for obtaining inter-frame chrominance signal histogram correlations from chrominance signal histograms among the contracted images of the frames (n−1), n, (n+1); and a cut frame judging unit for judging the attention frame n to be a cut frame from temporal changes in the inter-frame luminance difference of the attention frame n with respect to the inter-frame luminance differences of the frames (n−1) and (n+1) and temporal changes in the chrominance histogram correlation of the attention frame n with respect to the chrominance histogram correlations of the frames (n−1) and (n+1).

5. The scene cut frame detector according to claim 4, wherein:

if the time-varying imagery input to the contracted image producing unit is compressed video data, the contracted image producing unit produces the contracted image by using average data component in the compressed video data.

* * * * *